Figure 1:
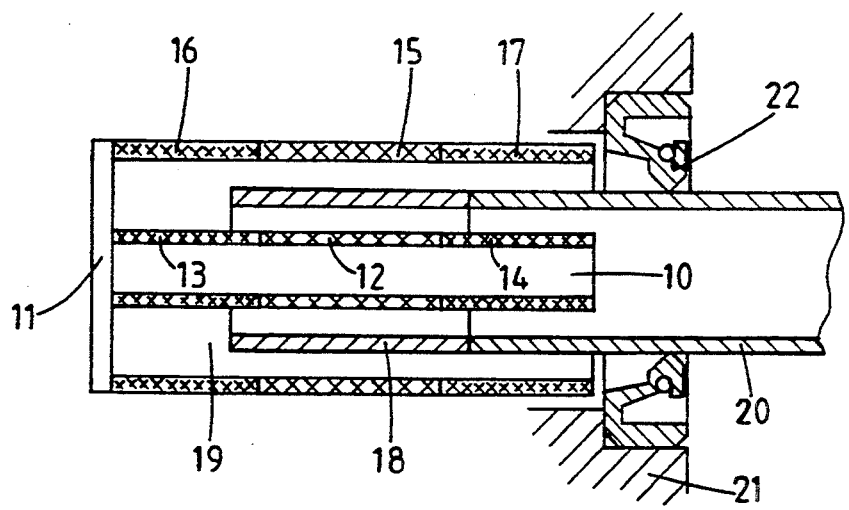

United States Patent [19]
Pitt

[11] Patent Number: 5,432,493
[45] Date of Patent: Jul. 11, 1995

[54] TWO LINEAR DIFFERENTIAL TRANSFORMERS WITH ARMATURE

[75] Inventor: William Pitt, Wolverhampton, England

[73] Assignee: Lucas Industries Public Limited Company, England

[21] Appl. No.: 206,390

[22] Filed: Mar. 4, 1994

[30] Foreign Application Priority Data

Mar. 5, 1993 [GB] United Kingdom ........... 9304522

[51] Int. Cl.6 .............. H01F 21/04; H01F 21/06
[52] U.S. Cl. ........................... 336/75; 336/136
[58] Field of Search ............ 336/75, 77, 136, 131, 336/130

[56] References Cited

U.S. PATENT DOCUMENTS

| | | | |
|---|---|---|---|
| 2,450,868 | 10/1948 | Berman | 336/75 |
| 2,753,532 | 7/1956 | Ashby et al. | 336/75 |
| 2,911,632 | 11/1959 | Levine et al. | 336/136 |
| 3,271,713 | 9/1966 | Oshima | 336/136 |
| 3,528,047 | 9/1970 | Iwata | 336/136 |
| 3,593,245 | 7/1971 | Iwata | 336/136 |

FOREIGN PATENT DOCUMENTS

| | | | |
|---|---|---|---|
| 2006202 | 3/1970 | Germany . | |
| 243379 | 3/1926 | United Kingdom | 336/75 |
| 254568 | 7/1926 | United Kingdom | 336/75 |

*Primary Examiner*—Thomas J. Kozma
*Attorney, Agent, or Firm*—Andrus, Sceales, Starke & Sawall

[57] ABSTRACT

A transformer arrangement is provided which has a primary and at least one secondary winding coupled via a movable armature which is outside of the windings. A second transformer can be provided which has primary and secondary windings coaxial with and surrounding the corresponding windings of the first transformer. The armature is tubular and slidable in the radial clearance defined between the windings of the first transformer and the windings of the second transformer.

3 Claims, 1 Drawing Sheet

# TWO LINEAR DIFFERENTIAL TRANSFORMERS WITH ARMATURE This invention relates to transformer arrangements.

It is known to mount linear differential transformers within piston and cylinder units, for example within jacks in hydraulic servo systems, to provide position signals. To facilitate making the wiring connections it is common practice to arrange that the transformer windings are mounted on a stationary part of the piston and cylinder unit, and the armature mounted on the movable part. It is known for the armature to take the form of a rod which is moved as an internal core within windings of the usual annular form. This requires that the armature be supported on a long slender non-magnetic support.

It is common practice in aircraft hydraulic servo systems to provide duplicate control loops, and this may require duplicated linear differential transformers. If separate transformers are mounted side by side the problem arises that the armatures must be mounted in exact alignment with their respective windings. It is therefore necessary either to prevent relative rotation between the piston and cylinder of the unit in which the transformers are mounted, or to mount the armatures in bearings on the movable element and to provide guides which maintain the armatures in alignment with their windings. This results in a cumbersome and complex assembly.

Alternatively the transformers may be axially aligned in tandem with each other. It is, however, frequently difficult or impossible to accommodate the tandem windings in the length available in the stationary element of the piston and cylinder unit. Additionally the armature must necessarily be supported on a relatively long stem which may flex and give inaccurate readings from the transducer arrangement.

According to a first aspect of the invention, there is provided a transformer arrangement comprising a linear differential transformer including a primary winding and at least one secondary winding cooperating with a tubular armature which is movable relative to the primary and secondary windings in a tubular zone surrounding the primary and secondary windings.

According to a second aspect of the invention there is provided a transformer arrangement comprising two linear differential transformers, each of which includes a primary winding and at least one secondary winding, said windings being co-axially arranged, one of said primary windings being surrounded, with radial clearance, by the other of said primary windings, the or each secondary winding of one of said transformers being surrounded, with radial clearance, by a corresponding secondary winding of the other transformer, and an armature axially movable in the radial clearance zone between said windings.

In a preferred embodiment the primary winding of the or each transformer is axially aligned with its secondary winding.

In a further preferred embodiment said armature is tubular.

According to a third aspect of the invention, there is provided a transformer arrangement comprising a linear differential transformer including a primary winding, at least one secondary winding, and an armature disposed outside the primary and secondary windings and movable with respect thereto so as to vary the coupling between the primary winding and the or each secondary winding.

Figure 2:
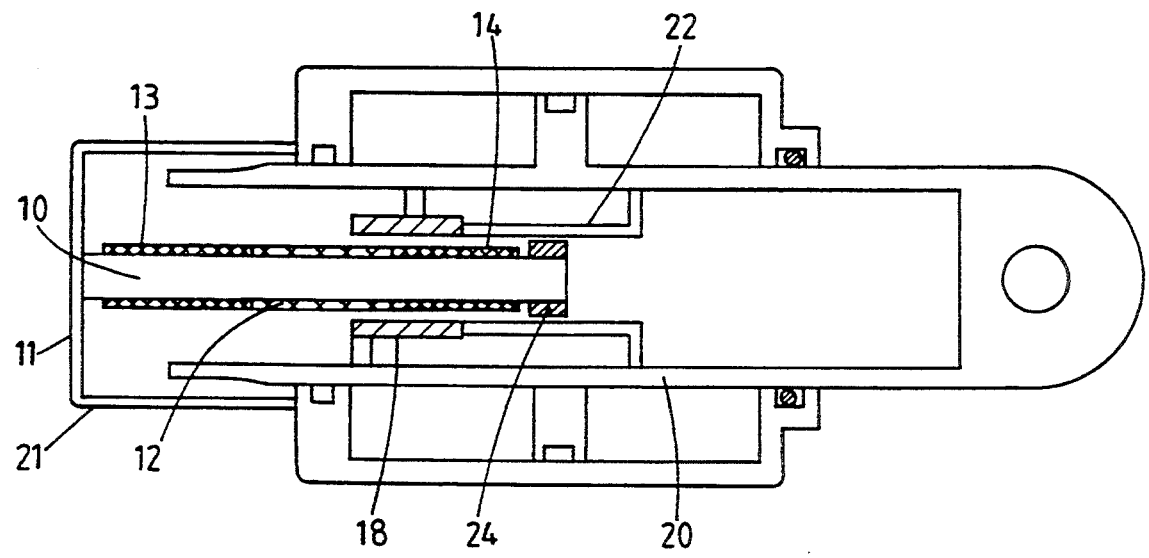

The invention will be further described, by way of example, with reference to the accompanying drawings, in which:

FIG. 1 shows a longitudinal section through a linear differential transformer arrangement constituting a first embodiment of the invention; and FIG. 2 shows a longitudinal section through a linear differential transformer arrangement constituting a second embodiment of the invention.

A cylindrical stem 10 is mounted on a circular end plate 11 and supports a primary winding 12 and two secondary windings 13, 14, the windings 12, 13 and 14 forming part of a first linear differential transformer. A further primary winding 15 co-axially surrounds the winding 12 with a constant radial clearance. Secondary windings 16, 17 are axially aligned with the winding 15 and co-operate therewith to form part of a second linear differential transformer. The windings 15, 16 and 17 are ultimately supported on the end plate 11. A tubular armature 18 is axially movable in the radial clearance zone 19 between the transducer windings, and is mounted on a non-magnetic tubular stem 20.

In use the plate 11 may be secured to the fixed part of a piston and cylinder unit and the stem 20 to a movable part of that unit. The armature 18 co-operates in a known manner with the coils 12, 13, 14 and with the coils 15, 16, 17 to provide duplicate electrical output signals which correspond to the axial position of the stem 20. Preferably the primary windings 12, 15 are supplied with energising currents of identical high frequencies, to reduce coupling between the coils of the first and second transformers and to eliminate the effects of beating between dissimilar but close frequencies supplied to the primary windings. It is envisaged that coupling between the two transformers will not be completely eliminated, but this may be used to advantage to check the operation of the arrangement, for example, if the primary winding 12 is energised output signals will be obtained from the windings 13, 14. If then the winding 15 is energised the level of the output signals from the windings 13, 14 should increase, thereby providing a check on the windings 13, 14, 15. The windings 12, 16, 17 may be checked in a similar manner.

The zero or null points of both transformers may readily be adjusted to be identical by moving the armature 18 to provide a zero output from one transformer, and subsequently adjusting the axial positions of the windings of the other transformer to give a zero output.

As described above the transducer windings are preferably located in a relatively stationary part of, for example, a piston and cylinder unit, this part being indicated at 21 on the drawing. A sealing element 22 may readily be mounted on the part 21 and engage the stem 20, to isolate the windings from contamination.

The embodiment shown in FIG. 2 has a primary winding 12 and two secondary windings 13 and 14, as in the first embodiment, but omits the further primary and secondary windings 15, 16 and 17, as shown. As before, the windings are supported on a cylindrical stem 10 attached to an end plate 11. The tubular armature 18, attached to the movable stem 20, moves longitudinally of the stem 10 with movement of the stem 20, thereby changing the relative coupling between the primary winding 12 and the secondary windings 13 and 14. The armature 18 is held on a tubular support 22 attached to the stem 20. A bearing 24 at the opposite end on the stem 10 to the end plate 11 helps to maintain the stem 10 coaxial with the armature 18.

As shown, the stem 20 may be the moving element within a hydraulic actuator.

The use of a tubular armature removes the need to have a slender support spindle extending a substantial proportion of the length of the actuator so as to hold the known core type design within the coils.

The tubular armature arrangement is more suited to use in a pressurised fluid environment than the known designs as the transducer formed thereby is only subjected to external pressurisation. The construction of the transducer is simplified. The coils are wound onto a solid mandrel since no internal passage is required in the mandrel for the passage of the armature, as in known designs. This may be especially advantageous in pressurised environments. Furthermore the armature does not act like a pump within the body of the mandrel, as can happen with the known designs.

It is thus possible to provide a robust displacement transducer using the transformer arrangement.

I claim:

1. A transformer arrangement comprising two linear differential transformers and an armature, each of said linear differential transformers including a primary winding and at least one secondary winding, said primary and secondary windings being coaxially arranged with one of said primary windings being surrounded, with radial clearance, by the other of said primary windings and the at least one secondary winding of said one of said transformers being surrounded, with radial clearance, by a corresponding secondary winding of said other transformer such that a radial clearance zone is defined between said one transformer and said other transformer, and said armature being axially movable in the radial clearance zone.

2. A transformer arrangement as claimed in claim 1, in which said primary winding of each transformer is axially aligned with said at least one secondary winding of the corresponding transformer.

3. A transformer arrangement as claimed in claim 1, in which said armature is tubular.

* * * * *